Patented July 11, 1939

2,165,257

UNITED STATES PATENT OFFICE 2,165,257

COLORING ACETATE ARTIFICIAL SILK

Richard Walter Hardacre, Norman Ellershaw Holden, and Cecil Shaw, Blackley, Manchester, England, assignors to Imperial Chemical Industries Limited, a corporation of Great Britain No Drawing. Application April 14, 1938, Serial No. 202,128. In Great Britain April 21, 1937

2 Claims. (Cl. 8—50)

This invention relates to coloring acetate artificial silk.

As is well known, acetate artificial silk when first introduced presented many difficulties in dyeing and printing. These difficulties have to a large extent since been overcome by the discovery of new dyeing processes and new dyestuffs. Among the new dyestuffs there are various derivatives of anthraquinones, in which the anthraquinone carries as substituents one or more amino groups or substituted amino groups. Among the derivatives of anthraquinone there are to be found the majority of the fastest acetate artificial silk dyestuffs at present on the market. However, while it has not been difficult to obtain such derivatives which dye in shades of yellow, orange, red, red-blue, blue, and the like, there has been great difficulty in obtaining derivatives which dye in green shades. Also the said derivatives are not soluble, but are made and used as readily-dispersible aqueous pastes, or much less frequently as readily disperisble powders. Although, in spite of the fact that they are not water-soluble, they can be readily dyed and printed, nevertheless users do not find water-insoluble dyestuffs so generally convenient as water-soluble ones. The latter are better adapted for making up dyebaths and printing pastes, need less care in storage, and are more satisfactory in coloring materials which are not readily penetrated.

In British specification No. 478,665 there is described, inter alia, the manufacture of a new anthraquinonyl-amino-aryl-azo-aryl-sulfonic acid namely 1-amino-4-p-benzene-azo-anilino-anthraquinone-2-sulfonic acid. This compound is formulated as below:

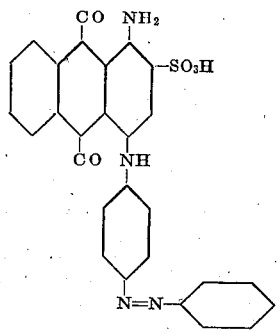

As stated in the above identified specification, this compound will dye animal fibers in green shades of very good fastness to washing, milling, and light.

We have now found that this compound will dye and print acetate artificial silk in bright green shades, which have excellent fastness to light, very good to excellent fastness to washing, and very good fastness in other respects.

The dyestuff will give pale, medium or deep shades. The dyestuff also has the advantage that it is soluble in water. Altogether, its properties are such that it is on a level with the best yellow to blue acetate artificial silk dyestuffs, and accordingly it is a very valuable acetate artificial silk dyestuff. This result is surprising. The high molecular weight of the compound, and the presence of a sulfonic acid group and an azo group are all features which would have been expected to militate against the compound possessing the tinctorial properties just mentioned.

The dyestuff used in the present invention is prepared by interacting p-amino-azo-benzene and sodium-4-bromo-1-amino-anthraquinone-2-sulfonic acid. It is not one of those like British Patent 310,827, which may be prepared by diazotizing a primary amino-anthraquinone or a derivative thereof and then coupling with a suitable component, because azo-benzene is not a coupling component.

British Patent No. 396,412 describes a process for making new azo coloring matters, which comprises coupling an azo coupling component with a diazo compound obtainable by diazotizing an anthraquinone compound containing an external diazotizable amino group, and exemplifies treating 1-methyl-amino-4-p-amino-phenyl-amino-anthraquinone with sodium nitrite and dilute acetic acid, and then treating the resulting product with phenol and sodium carbonate. The dyestuff of our invention cannot be made by that process because benzene is not a coupling component. Also the dyestuff of our invention differs from the other dyestuff just mentioned in being a sulfonic acid and soluble in water.

The present invention accordingly includes a process for the coloring of acetate artificial silk which comprises the application thereto of 1-amino-4-p-benzene-azo-anilino-anthraquinone-2-sulfonic acid. The invention also includes colored acetate artificial silk when obtained by this process.

The dyestuff may be used either as free sulfonic acid, or as a soluble salt thereof, e. g. as the sodium salt. As already stated it is soluble in water, and consequently it may be used without first submitting it to a process such as a solubilizing process, so as to ensure its presence in the dyebath in a sufficiently high degree of dispersion. Dyeing may be effected in the way customary for amino-anthraquinone acetate artificial silk dyestuffs, namely, from an aqueous bath, which is worked first warm and then at 80–85° C. A small proportion of a soluble salt, e. g. sodium chloride is preferably added to the dyebath to give good exhaustion. Printing may be effected by making up a paste containing the dyestuff and a gum thickening, together with a little alkali, and if desired a dissolving printing assistant and an oxidizing agent such as sodium-m-nitro-benzene-sulfonate, printing this paste on the textile material and then steaming and washing.

The following examples in which parts are by weight illustrate, but do not limit the invention.

Example I 1 part of the sodium salt of 1-amino-4-benzene-azo-anilino-anthraquinone-2-sulfonic acid is added to 4000 parts of water at 50° C. 100 parts of acetate artificial silk yarn are scoured in a warm very dilute solution of soap and ammonia, washed in cold water and entered into the dyebath. 12.5 parts of sodium chloride are added to the dyebath, the temperature is raised slowly to 80–85° C., another 12.5 parts of sodium chloride are added, and the dyebath is then kept at 80–85° C. For three quarters of an hour, the yarn being turned in the dye liquor continuously. The yarn is then removed from the dyebath, washed in cold water and dried. A bright green dyeing is obtained, which has excellent fastness to light, very good to excellent fastness to washing, acetic acid, sodium carbonate and hot pressing, and good fastness to sulfuric acid and burnt coal-gas fumes.

Example II

A printing paste is made up as follows:
1 part of the sodium salt of 1-amino-4-p-benzene-azo-anilino-anthraquinone-2-sulfonic acid, and 2 parts of the sodium salt of dibenzyl-aniline-sulfonic acid are dissolved in 37 parts of 1% aqueous potassium carbonate solution. The resulting solution is stirred into 60 parts of crystal gum thickening 20% (which has been made slightly alkaline), and 1 part of sodium-m-nitro-benzene-sulfonate. This paste is printed on acetate artificial silk woven textile material, the material is then dried and steamed in moist steam at 100° C. for half an hour. The steamed material is then washed in cold water to remove the thickening and dried. Green shades of very good to excellent fastness to washing are obtained. Little or no marking off by sublimation takes place during the steaming process.

As many apparently widely different embodiments of this invention may be made without departing from the spirit and scope thereof, it is to be understood that we do not limit ourselves to the specific embodiments thereof except as defined in the appended claims.

We claim:
1. Process for coloring acetate artificial silk, which comprises the application thereto of 1-amino-4-p-benzene-azo-anilino-anthraquinone-2-sulfonic acid.
2. Acetate artificial silk colored with the dyestuff 1-amino-4-p-benzene-azo-anilino-anthraquinone-2-sulfonic acid.

RICHARD WALTER HARDACRE.
NORMAN ELLERSHAW HOLDEN.
CECIL SHAW.